United States Patent
Lawson et al.

(10) Patent No.: US 12,099,961 B2
(45) Date of Patent: Sep. 24, 2024

(54) PACKAGE DELIVERY MANAGEMENT SYSTEMS AND METHODS

(71) Applicant: United States Postal Service, Washington, DC (US)

(72) Inventors: Angela Dawn Lawson, Cambridge, MA (US); Fatema Momenni Kennedy, Dumfries, VA (US); Junghyun Hwang, Herndon, VA (US)

(73) Assignee: United States Postal Service, Washington, DC (US)

( * ) Notice: Subject to any disclaimer, the term of this patent is extended or adjusted under 35 U.S.C. 154(b) by 440 days.

(21) Appl. No.: 17/145,719

(22) Filed: Jan. 11, 2021

(65) Prior Publication Data

US 2021/0216962 A1 Jul. 15, 2021

Related U.S. Application Data

(60) Provisional application No. 62/958,900, filed on Jan. 9, 2020.

(51) Int. Cl.
*G06Q 10/0833* (2023.01)
*G06Q 10/0633* (2023.01)
*G06Q 10/0639* (2023.01)

(52) U.S. Cl.
CPC ..... *G06Q 10/0833* (2013.01); *G06Q 10/0633* (2013.01); *G06Q 10/06393* (2013.01)

(58) Field of Classification Search
CPC ......... G06Q 10/06393; G06Q 10/0633; G06Q 10/0833
See application file for complete search history.

(56) References Cited

U.S. PATENT DOCUMENTS

| | | | |
|---|---|---|---|
| 7,050,938 B1 * | 5/2006 | Prater | G06Q 10/087 702/182 |
| 11,429,927 B1 * | 8/2022 | Melancon | G06Q 10/06313 |
| 2009/0184836 A1 * | 7/2009 | Kotula | G05B 23/0245 340/674 |
| 2014/0222710 A1 * | 8/2014 | Wheelock | G06Q 10/0833 705/333 |
| 2018/0046970 A1 * | 2/2018 | Biswas | G06Q 10/083 |
| 2020/0160265 A1 * | 5/2020 | Urban | G06Q 10/0631 |

OTHER PUBLICATIONS

Eclipse. (Nov. 10, 2020). How to prevent picking errors in a warehouse. Linnworks. https://www.linnworks.com/blog/prevent-picking-shipping-quantity-errors/ (Year: 2020).*

* cited by examiner

*Primary Examiner* — Shannon S Campbell
*Assistant Examiner* — Manal A. Alsamiri
(74) *Attorney, Agent, or Firm* — Knobbe, Martens, Olson & Bear, LLP

(57) ABSTRACT

A system and method for tracking and managing package delivery within a distribution network. Many events happen during the processing, moving, and delivery of a package. Systems and methods herein identify whether all expected events occur, whether scan locations are correct, whether delivery times are met, and other requirements. Problems or potential problems can be identified and corrected.

20 Claims, 6 Drawing Sheets

US 12,099,961 B2

PACKAGE DELIVERY MANAGEMENT SYSTEMS AND METHODS

CROSS-REFERENCE TO RELATED APPLICATIONS

This application claims the benefit of U.S. Provisional Application Ser. No. 62/958,900, filed Jan. 9, 2020, which is hereby incorporated by reference in their entirety and for all purposes.

BACKGROUND

The development relates to systems and methods to quantify package delivery performance, identify and correct operational issues, and ensure satisfactory package delivery.

In one aspect described herein, a method for distributing items comprises receiving, in an interface, a request for delivery performance information; requesting, by a server, item information for a plurality of items in a distribution network; analyzing the item information for the plurality of items according to one or more delivery criteria; determining, in the server, whether analysis indicates that any of the plurality of item fails to meet one or more delivery criteria; identifying a potential failure based on the determining any of the plurality of items fails to meet the one or more delivery criteria; and initiating a corrective action to address the potential failure.

In some embodiments, the tem information comprises scan information and location information In some embodiments, the one or more delivery criteria comprise a plurality of rules.

In some embodiments, the request for delivery performance information comprises a subset of the plurality of rules.

In some embodiments, the request for delivery performance information comprises a selection of geographic area.

In some embodiments, requesting item information comprises requesting the item information for the plurality of items which are associated with the selected geographic area.

In some embodiments, identifying the potential failure comprises identifying a potentially failed piece of item processing equipment within the selected geographic area.

In some embodiments, the request for delivery performance information comprises a selection of a period of time.

In some embodiments, requesting item information comprises requesting the item information for the plurality of items which are associated with the selected period of time.

In some embodiments, the method further comprises generating, for each of the plurality of items, a score based on determining whether any of the plurality of items fails to meet the one or more delivery criteria and generating an overall score for the plurality of items based on the determined scores for each of the plurality of items.

Ain another aspect described herein, a system for distributing items comprises a processor configured to: receive, from an interface, a request for delivery performance information; request item information for a plurality of items in a distribution network; analyze the item information for the plurality of items according to one or more delivery criteria; determine, in the server, whether analysis indicates that any of the plurality of item fails to meet one or more delivery criteria; identify a potential failure based on the determining any of the plurality of items fails to meet the one or more delivery criteria; and initiate a corrective action to address the potential failure.

In some embodiments, the tem information comprises scan information and location information In some embodiments, the one or more delivery criteria comprise a plurality of rules.

In some embodiments, the request for delivery performance information comprises a subset of the plurality of rules.

In some embodiments, the request for delivery performance information comprises a selection of geographic area.

In some embodiments, the processor is further configured to request the item information for the plurality of items which are associated with the selected geographic area.

In some embodiments, the processor is further configured to identify a potentially failed piece of item processing equipment within the selected geographic area.

In some embodiments, the request for delivery performance information comprises a selection of a period of time.

In some embodiments, the processor is further configured to request the item information for the plurality of items which are associated with the selected period of time.

In some embodiments, the processor is further configured to generate for each of the plurality of items, a score based on determining whether any of the plurality of items fails to meet the one or more delivery criteria and to generate an overall score for the plurality of items based on the determined scores for each of the plurality of items.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with the additional specificity and detail through use of the accompanying drawings.

DETAILED DESCRIPTION

Figure 1:
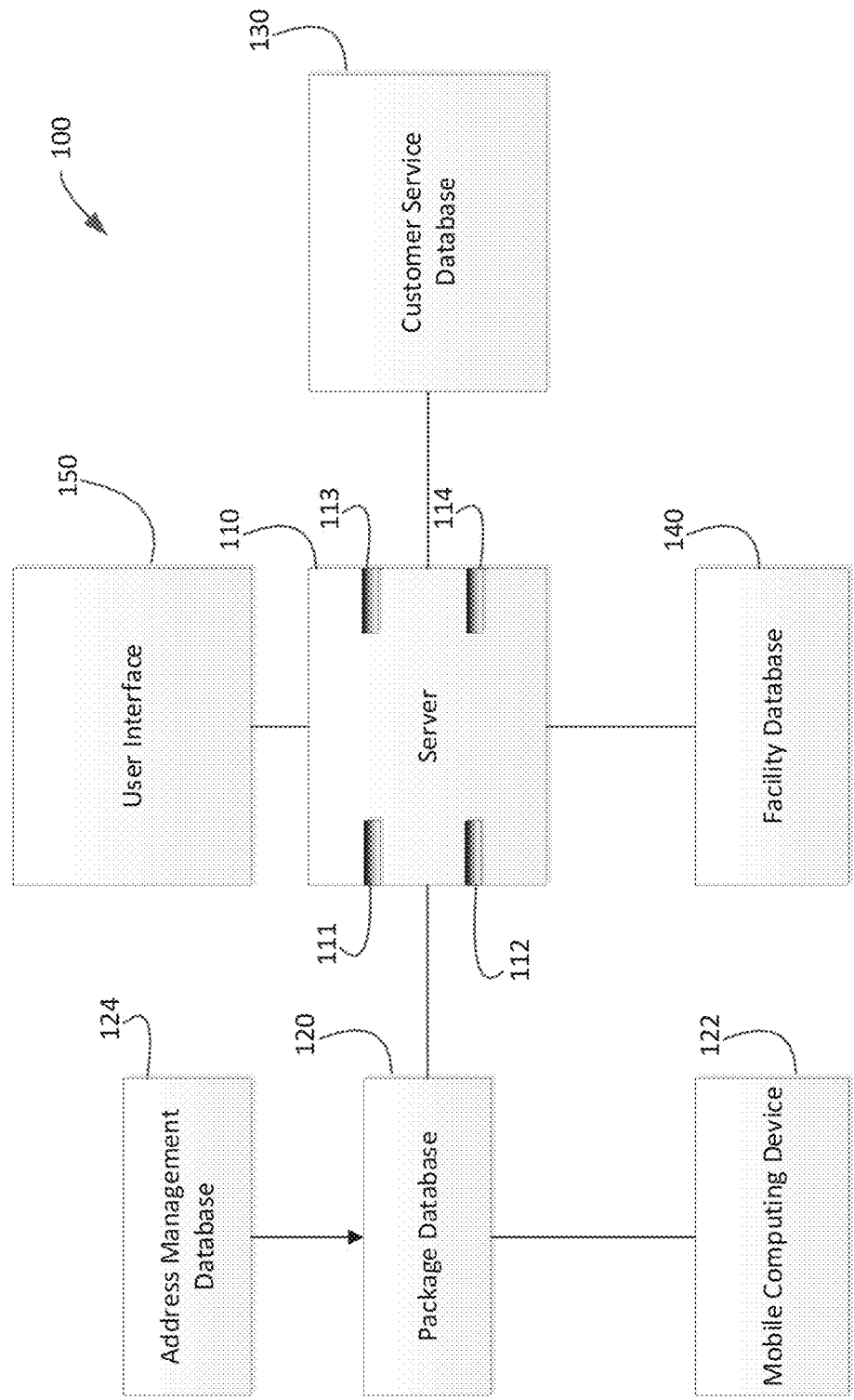
FIG. 1 is a block diagram of an embodiment of a system for managing package delivery.

A distribution network delivers packages to homes, businesses, customers, recipients, etc. The timely and correct delivery of packages is desirable for recipients, and can be advantageous for the distribution network. Ensuring timely and correct delivery of packages involves gathering package delivery information in real-time, near real time, on a daily basis, weekly basis, or on other time frame. The package delivery information can be used to identify past trends, identify specific problem areas, predict trends, intervene when a delivery standard is in jeopardy, and to provide customers with visibility and assurance that package delivery will meet customer requirements.

A distribution network may comprise multiple levels. For example, a distribution network may comprise regional distribution facilities, hubs, and unit delivery facilities, or any other desired level. A nationwide distribution network, for example, may comprise one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or many unit delivery facilities, and can sort and deliver items to the unit delivery facilities with which it is associated. In the case of the United States Postal Service, the unit delivery facility (or delivery unit) may be associated with a ZIP Code. The unit delivery facility receives items from local senders, and from hub level facilities or regional distribution facilities. The unit delivery facility also sorts and stages the items intended for delivery to destinations within the unit delivery facility's coverage area.

The distribution network can use data from a variety of sources to assess and improve package delivery, including sorting equipment, mobile computing devices, customer service call centers, address management systems, and others. A central server, processor, or hub can coordinate a package tracking system, and can generate a variety of interfaces, reports, and actions for improving package delivery performance and customer experience. Although the term package is used here, one of skill in the art would understand that the tracking and management systems described herein could be used for tracking many types of items, such as parcels, letters, flats, inventory items, containers, units in logistics systems, and the like.

As used herein, the term item may refer to an individual article, object, agglomeration of articles, or container having more than one article within, in a distribution system. An item may be a letter, magazine, flat, luggage, package, box, or any other item of inventory which is transported or delivered in a distribution system or network. The term item may also refer to a unit or object which is configured to hold one or more individual items, such as a container which holds multiple letters, magazines, boxes, etc. The term item may also include any object, container, storage area, rack, tray, truck, train car, airplane, or other similar device into which items or articles may be inserted and subsequently transported, as are commonly used in distribution systems and networks.

The features, aspects, and advantages of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

The system and method described herein relate to generating and communicating an expected delivery window. FIG. 1 depicts an embodiment of a system 100 for tracking and managing package delivery. The system 100 comprises a server 110, a package database 120, a customer service database 130, a facility database 140, and a user interface 150.

The server 110 may comprise or be a component of a processing system implemented with one or more processors. The server 110 may be a network of interconnected processors housed on one or more terminals. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The server 110 may comprise a processor 111 such as, for example, a microprocessor, such as a Power PC® processor, an Alpha® processor, a microcontroller, a multi-core processor, an Intel CORE i7®, i5®, or i3® processor, an AMD Phenom®, A-Series®, or FX® processor, or the like. The processor 111 typically has conventional address lines, conventional data lines, and one or more conventional control lines. The processor 111 may be in communication with a processor memory 112, which may include, for example, RAM memory, flash memory, ROM memory, EPROM memory, EEPROM memory, registers, hard disk, a removable disk, a CD-ROM, or any other form of storage medium known in the art. The processor memory 112 may include, for example, software, at least one software module, instructions, steps of an algorithm, or any other information. In some embodiments, the processor 111 performs processes in accordance with instructions stored in the processor memory 112. These processes may include, for example, controlling features and/or components of the package delivery management system 100, and controlling access to and from, and transmitting information and data to and from the server 110 and the constituent components of the package delivery management system 100, as will be described herein.

The server 110 comprises a system memory 113, configured to operating instructions and data for operation of the server 110. The system memory 113 may comprise a database, a comma delimited file, a text file, or the like. The server 110 is configured to coordinate and direct the activities of the components of the system 100, and to coordinate use, directions, notifications, and other processes associated with the distribution of items, to analyze data from connected sources, perform analytics, generate displays, alerts, notifications, and other processes and functions.

In some embodiments, the processor 111 is connected to a communication feature 114. The communication feature 114 is configured for wired and/or wireless communication. In some embodiments, the communication feature 114 communicates via telephone, cable, fiber-optic, or any other wired communication network. In some embodiments, the communication feature 114 may communicate via cellular networks, WLAN networks, or any other wireless network. The communication feature 114 is configured to receive instructions and to transmit and receive information among components of the system 100, and in some embodiments, with a central server (not shown) or other resource outside the system 100, as desired.

The server 110 is in communication with the package database 120. In some embodiments, the package database 120 may comprise a processor, memory, databases, address and control lines, and other components similar to those described herein for the server 110. In some embodiments, package database 120 may be configured to use the processor, memory, databases, address and control lines, and other components of the server 110, or a combination of its own components and the server 110's components. In some embodiments, the package database 120 can be hosted on a server (not shown) external to system 100.

The package database 120 stores, processes, receives, and manipulates data regarding package delivery in the distribution network. The package database 120 can store, use, and process information gathered from other components of the delivery network, such as sorting equipment, scanners, and the like. Any scan information generated when a package is scanned as it is inducted into and moves through the distribution network, and is ultimately delivered is stored in the package database 120. The package database 120 can store scan information, such as information about scan events for packages, delivery points for the items to be delivered, delivery schedules such as estimated delivery times and dates, and the like. The package database 120 is in communication with a mobile computing device 122.

The mobile computing device 122 comprises one or more processors, an interface, a scanning module, and a geolocation module. The scanning module can be used to scan computer readable codes on packages. The computer readable code on the package can uniquely identify the package to the distribution network. The computer readable code can include one or more codes, such as barcodes, QR codes, RFID tags, etc. The computer readable code can also be scanned on package processing equipment in a distribution facility in addition to the mobile computing devices 122. The geolocation module is in communication with GPS satellites and can discover the specific location of the system 100 through its communications with the GPS satellites. In some embodiments, the GPS module 110 uses other position determining systems to determine the system 100's its exact location, such as GLONASS, COMPASS, multilateration, Wi-Fi detection, triangulation, or LORAN.

In some embodiments, the scanner is used to scan a package when it is loaded on a vehicle, when it is delivered, and at other times in the distribution network. The geolocation module identifies the geographic location of the mobile computing device 122 on a regular interval, and when a scan is performed with the mobile computing device 122. The mobile computing device 122 provides location information corresponding to the scan information generated by the scanning module. The mobile computing device 122 generates and provides scan information and the associated location information to the package database 120. The location information can include the geographic location of a resource, delivery device, item processing equipment when a scan event or other event occurs. For example, the scan information can include the location of the scanning device or mobile device at the time of a scan of a package, a time of the scan, etc.

In some embodiments, the mobile computing device 122 can be similar to the mobile delivery devices carried and/or used by resources within the USPS.

The package database 120 is in communication with an address management database 124. The address management database stores, processes, receives, transmits, and/or manipulates data and information related to delivery points in the distribution network. The package database 120 can store, for each package in the distribution network, the sender of the package, an intended recipient of the package, class of service, and the like. The address management database 120 can store a geographic location, such as GPS coordinates, associated with each delivery point, each distribution network facility, and/or other locations, buildings, facilities, etc. The geographic location can be updated periodically or continuously by other systems and/or components of the distribution network.

In some embodiments, when scan information and location information for a package scan are received for a delivery of a package, the package database 120 can request and/or receive the geographic location of the delivery point to which the package was to be delivered. The package database 120 and/or the server 110 can compare the location information with the stored geographic location of the delivery point to determine whether the delivery occurred at the correct delivery point.

The server 110 is in communication with the customer service database 130. In some embodiments, the customer service database 130 may comprise a processor, memory, databases, address and control lines, and other components similar to those described herein for the server 110. In some embodiments, the package database 130 may be configured to use the processor, memory, databases, address and control lines, and other components of the server 110, or a combination of its own components and the server 110's components. In some embodiments, the customer service database 130 can be hosted on a server (not shown) external to system 100.

In some embodiments, the customer service database 130 can receive, store, use, manipulate, transmit, etc. information related to customer service activities within the distribution network. For example, a customer, recipient, or intended recipient of a package may call a customer service center, submit a customer service query online, or contact customer support via another avenue or interface. These customer service requests can be input, modified, researched, resolved, etc., by manual and/or automated systems. The information regarding the resolution, the instance of a customer service request, etc., are stored in the customer service database 130, and can be used to evaluate and assess package delivery performance. In some embodiments, the customer service database 130 can store a transcript of a call received at a customer service center. The customer service database 130 can employ one or more tools to analyze the call transcript, either in audio or textual form, to extract relevant data, such as type of complaint, data or information provided to a customer, package numbers, resolution status, and the like.

The customer service database 130 an also receive, store, use, manipulate, and/or utilize information from transactions at retail counters or customer service counters, such as at a post office within USPS. When a customer provides a package for delivery at a post office, the information regarding the package to be sent can be stored in the customer service database 130, a label, barcode, etc., can be created, and the label, code, etc. and package information associated therewith can be stored in the package database 120.

The server 110 is in communication with the facility database 140. In some embodiments, the facility database 140 may comprise a processor, memory, databases, address and control lines, and other components similar to those described herein for the server 110. In some embodiments, the facility database 140 may be configured to use the processor, memory, databases, address and control lines, and other components of the server 110, or a combination of its own components and the server 110's components. In some embodiments, the facility database 140 can be hosted on a server (not shown) external to system 100.

The facility database 140 can store, receive, use, manipulate, transmit, etc., information related to facilities, the processing equipment at the facilities, and the like. For example, the facility database 140 can store and use information regarding package movement through the distribution network, including prospective information about where a package is expected to be at certain days/times as it moves through the distribution network. Each package and its expected delivery date/time, any issues associated therewith, rerouting, delays, etc., can be identified and stored in the facility database 140.

The server 110 is in communication with a user interface 150. The user interface 150 can be a graphical user interface accessible to supervisory or other personnel to display information regarding a particular item and its completed or intended delivery. In some embodiments, the user interface 150 can display aggregate or cumulative package information for a variety of categories, such as by geographic region, package type, day or week, and the like. The user interface 150 can be modified and manipulated to display package information such as package scores, package metrics, graphical information, historical information, and the like, as desired.

Various factors and information can be used by the server 110 to generate performance information, such as item delivery performance information. The delivery performance information can include package scores, indications of passes and failures, etc. In some embodiments, the delivery performance information includes overall package scores 262, and all the other information shown in FIG. 2 Table 1 depicts an exemplary list of factors or rules used in some embodiments of a package score, such as a "perfect package" score determination, including the category, a description, and a result.

A "Fail" value in the Result column indicates that an item which meets a rule will receive a failing score for that rule. A "Fail*" value, such as on Rule 15-17, indicates that there is possible failure, but that additional information is required prior to determining a failure. An item receiving a failing score for any of the rules will receive a failing score in the perfect package determination. In some embodiments, the server 110 can determine an item fails the perfect package score when the item receives a "Fail" on two or more rules. In some embodiments, an item will not receive a failing score if the only failing score is a "Fail*" score, such as for Rules 15-17.

Rule 1 analyzes the type of barcode or identifier on an item within the distribution network. If an item having a computer readable code thereon, such as a barcode, is received in the distribution network, but the barcode is for an item type other than a package, then the item is exempt for the package score. In some embodiments, the server 110 will not calculate or determine an item score, will not assign a pass/fail score for the item or barcode, or the server 110 will provide a score, but the score will not be utilized in other systems or analytics. The barcode on an item can encode an item type. If the item type is other than a package based on the barcode or identifier as received in the server 110, then under Rule 1, the server 110 determines that the item is exempt from the package score processes described

TABLE 1

| Rule | Category | Description | Result |
| --- | --- | --- | --- |
| 1 | Overall Exempt | Non Package Barcodes | Exempt |
| 2 | Overall Exempt | Parcel Return Service | Exempt |
| 3 | Overall Exempt | Letter (except Priority Mail and Priority Mail Express) | Exempt |
| 4 | Service Date | Military/International Outbound; Green Card | Exempt |
| 5 | Service Date | N/A Scheduled Delivery Date (SDD) Not Yet Reached | Exempt |
| 5-1 | Service Date | N/A - Not Yet in USPS Possession | Exempt |
| 6 | Service Date | Late | Fail |
| 7 | Service Date | Late, Missing Stop the Clock Scan | Fail |
| 8 | Service Date | Late, FFA, Missing Delivery | Fail |
| 9 | Service Date | Express Missing SDD | Fail |
| 10 | Service Date | Non Express Missing SDD | Fail |
| 11 | Scan Distance | N/A In Office | Exempt |
| 12 | Scan Distance | N/A Not Enough Data | Exempt |
| 13 | Scan Distance | Improperly Scanned by IMD Hand Held | Fail |
| 14 | Scan Distance | Delivery Scan Not At Location | Fail |
| 15 | Scan Distance | Delivery Scan Not At Location, Scanned In Office | Fail* |
| 16 | Scan Distance | Possible Incorrect Park Point Location Failure | Fail* |
| 17 | Scan Distance | Scanned Multiple Pieces in Succession Location Failure | Fail* |
| 18 | Visibility | N/A SDD Not Yet Reached | Exempt |
| 18-1 | Visibility | Military - Missing Arrival at Unit Scan | Exempt |
| 19 | Visibility | Failed First Attempt | Fail |
| 20 | Visibility | Missing Arrival at Unit Scan | Fail |
| 21 | Visibility | Missing Out for Delivery Scan (or "N/A In Office") | Fail (Exempt) |
| 22 | Visibility | Missing Acceptance Scan | Fail |
| 23 | Visibility | Missing Origination Enroute Scan | Fail |
| 24 | Visibility | Missing Destination Enroute Scan | Fail |
| 25 | Visibility | Missing Acceptable Delivery Event Scan | Fail |
| 26 | Customer Inquiry | Customer Inquiry | Fail |

The rules are evaluated by the server using the appropriate data from the system 100. The category column indicates the category of performance under which a rule is evaluated. An exempt category means that rule does not necessarily result in a failure or a lowered overall package score 262. For example, an item having a value which meets or fails an exempt rule may not necessarily receive a failing score or lower score. In some embodiments, an "Exempt" value means that there is insufficient data to give a passing or failing score to an item, so the item is excluded from the calculations and analysis.

herein, and data associated with the exempt item is not used in the determinations described herein.

Rule 2 analyzes whether the package has a barcode or other identifier thereon, or other information associated with the item or with the identifier that indicates that the package is a return parcel, such as when a customer returns merchandise to a merchant or sender. If the package is a return parcel, the server 110 determines the package is exempt from the package score process.

Rule 3 analyzes if the item is a piece of letter mail. As noted above, the barcode on an item can indicate the item type and the item class. If the item type is a letter, and the item class is neither Priority Mail nor Priority Mail Express (or any other desired service class), then the server 110 determines that the letter is exempt from the score processes herein. If the letter is Priority Mail or Priority Mail Express, or other desired service class, the server 110 determines that the letter is to be analyzed for package processes described herein.

Rules 4-10 relates to service date requirements. A service date can be a required delivery date, a guaranteed delivery date, an induction date, and the like. The server 110 can analyze information from the package database 120 and the facility database 140 to determine whether service dates are met. For example, if a scan, such as an induction scan, an item processing equipment scan, or other scan occurs at a time after an expected event, after a guarantee delivery date, etc., then the server 110 can provide a failing score for the package.

Rule 4 analyzes items that are intended for shipment to US military locations or which is outbound for international shipment. Such items will be handled by other postal services or carriers which are not the USPS. The server 110 determines that such items intended for overseas destinations are exempt, as the USPS has little or no control over the delivery of these items. These items are not used in the package score processes described herein.

Rule 5 analyzes whether a package has no scheduled delivery date, or whether the package is not subject to schedule delivery date requirements. This can occur with some service classes, and/or can be an option selected by a sender. If the package does not have scheduled delivery date (SDD) requirements, the server 110 determines that the package is exempt from the service date metrics described herein. The package may still be analyzed under the other rules listed herein.

Rule 5-1 analyzes a package's SDD and determines whether the package is in the possession of the distribution network. The server 110 can query the package database 120 to determine whether there has been an induction scan for the package, or whether there have been any other scans stored in the package database 120 for the package. The server 110 can query the facility database 140 to determine whether there is any visibility information for the package. If there is no information showing the package has been received into the distribution network, the server 110 determines that the package is exempt from service date evaluation and the package processes described herein. In some embodiments, the server can determine that such a package is still used in the package score processes herein, but no service date rules apply. That is, if the package fails a service date rule, the server 110 can determine that the package does not receive a failing score in the package score.

Rule 6 analyzes whether a package was delivered by the SDD. The server 100 receives information on SDD from the facility database 140 and/or the package database 130 which was created when the package was created, requested, a label was generated, a service class was selected, a customer requested a guaranteed delivery date, etc. The server 100 queries the package database 120 for a delivery scan or an out for delivery scan, which would have been generated from the mobile computing device 122. If the date and/or time of the delivery scan or the out for delivery scan is after a scheduled delivery date for the package, the server 110 determines that the package receives a failing score. In some embodiments, if the out-for-delivery or delivery event scan occurs later in the day than an expected or guaranteed time, or is later than the required or expected time, then the server 110 can determine the package is late, and the package fails this rule and fails the service date metric.

Rule 7 analyzes whether a stop-the-clock scan exists for the package. A stop-the-clock scan for a package can occur when a carrier scans, using the mobile computing device 122, the item for delivery at the delivery point. A stop-the-clock scan can also occur when the package is scanned via the mobile computing device 122 for an attempted delivery, for example, when a recipient is not available to sign for a package, or when physical conditions do not permit package delivery to a delivery point. In some embodiments, a package may have an out for delivery scan stored in the package database 120, but there is no corresponding stop-the-clock scan. This can occur if the carrier forgets to scan the package at the delivery point, if the barcode is not scannable, or for a number of other reasons. If the package does not have a subsequent return to office scan, which would occur if the package had not been delivered, it is assumed that the package was delivered, but not scanned at the delivery point. In these situations, where a stop-the-clock scan event is expected but is missing for a package, the server 110 determines that the package receives a failing score for the service date metric.

Rule 8 analyzes whether a failed first attempt has occurred for the package. The failed first attempt (FFA) can be indicated by a scan of the package at the delivery point where the carrier inputs the FFA. In some embodiments, the server 110 infers an FFA when a package receives an out for delivery scan, and then receives a return to unit scan. These scans are stored in the package database 120 or in another location accessible to the server 110. In these cases, the server 110 determines that a FFA has occurred, and the server 110 assigns a failing score in the package score process.

Rule 9 analyzes whether an item of express mail missed the SDD. The server 110 analyzes the date and/or time of the delivery scan or out for delivery scan from the package database 120. If the delivery scan or out for delivery scan for the express mail item occurs after the SDD, the server 100 determines that the express mail item fails the service date metric.

Rule 10 analyzes whether an item of non-express mail which has an SDD missed the SDD. The server 110 analyzes the date and/or time of the delivery scan or out for delivery scan from the package database 120. If the delivery scan or out for delivery scan for the mail item having an SDD occurs after the SDD, the server 100 determines that the mail item fails the service date metric.

Rules 11-17 evaluate package delivery with regard to scan distance. The scan distance is analyzed using data from the mobile computing device 122, including scan location as described above, and comparing the scan location to the geographic information, such as geographic coordinates or a geo-fence stored for intended delivery point of an item in the address management database 124. This analysis can occur in the package database 120 or in the server 110, as desired. Geofences or threshold distances can be established for the scan distance analysis. In some embodiments, a geofence exists for each delivery point, and that geofence is stored in the address management database 124. If a scan occurs in the geofence, the scan distance requirement can be satisfied, that is, a scan can be determined to have occurred at the correct delivery point when the scan occurs within the stored geofence for the delivery point.

In some embodiments, the scan distance threshold can be a fixed distance, such as 5 meters from stored address coordinates. In some embodiments, the threshold can be a percentage of a geofence boundary. For example, a scan event occurring within one or two standard deviations of an average geofence boundary distance can be determined to meet a scan distance requirement. In some embodiments, the scan distance threshold can change based on the type of delivery point. If the delivery point is on a rural route, the threshold distance can be larger than for a delivery point in an urban or suburban environment. These threshold requirements can be stored and accessed by the server 110 in making the scan distance determinations.

Rule 11 analyzes whether a scan location is in an office, for example, in a Post Office or other facility of the USPS. For a scan event, the server 110 analyzes the scan data, including the location data from the package database 120. The location data is compared to known locations, such as delivery points in the distribution network. The address management database 124 can also store geographic location information, such as a geofence, for distribution network facilities. If the scan location indicates that the package was scanned at a distribution network facility, the scan is not analyzed for scan distance, and this scan event is not included in the package score processes described herein.

Rule 12 analyzes whether there is sufficient location information for a scan to make a determination. If a stored scan event for a package does not have geographic location data associated with it, or does not have sufficient location information, then the server 110 determines that the scan event is exempt, and it is not considered in the package score processes.

Rule 13 analyzes whether a package was improperly scanned at a retail facility. The Intelligent Mail Device (IMD) can be a scanner used at a retail counter, such as at a post office. In some embodiments, a clerk at a retail counter can improperly scan a package, either on acceptance or on handing a package to a customer. When a scan at a retail facility is improper, the server 110 determines that the scan of that package receives a failing score. Some packages can be delivered to lockers, boxes, etc., within a distribution facility, such as a PO box or other box at a post office. The IMD scanner is used in the post office for delivery scans. If the server 110 identifies that a package which is to be delivered to a delivery point other than a location in a facility, or in a post office, is scanned with an in-office scanner or IMD (rather than with a carrier's mobile computing device 122), then the server 110 determines that the package fails the scan distance metric. This could occur where a retail clerk or other office employee scans a package as delivered at the post office with an IMD, rather than sending the item out for delivery to the delivery point.

Rule 14 analyzes whether the delivery scan occurred at the delivery point. The server obtains and analyzes scan data, including delivery scans and the associated location information from the package database 120. The server 110 also receives the intended delivery point for the package from the package database 120, and the geographic location information for the intended delivery point from the address management database 124, via the package database 120. The server 110 determines whether the scan of the package occurred at the intended delivery point. This determination can be done by determining whether the location of the mobile computing device 122 at the time of the package scan was within a geofence established for the intended delivery point, or was within a threshold distance of the delivery point, as described herein. If the delivery scan occurred at a location other than the intended delivery point, but occurred, for example, at a different delivery point (which could indicate delivery to the incorrect address), the server 110 determines that the package receives a failing score for the scan distance requirement in the package score process.

Rule 15 analyzes whether a delivery scan occurs at an office, such as a post office. In some embodiments, a carrier performs a delivery scan at a postal facility. The server 110 can analyze the location of the delivery scan information received from the package database 120. If the scan occurs at a postal facility, the server 110 can evaluate additional information, such as item type, service class, etc., for the packages. Some types of packages need only be scanned at the facility prior to delivery, so the server 110 will not determine that a package fails the scan distance metric based solely on the delivery scan occurring at an office or distribution network facility. If, however, a package has an item type or service class which requires a delivery scan at the delivery point, the server 110 will identify a delivery scan at an office for such a package as failing the scan distance metric.

Rule 16 analyzes scans at a park point. A park point can be a point where a carrier parks a vehicle and takes packages in hand to deliver the packages to a plurality of delivery points near the park point. A package can be scanned at a park point in order to streamline delivery, or to indicate that the package was removed from the vehicle. The server 110 can analyze scan information for packages and determine whether they occurred a park points. The geographic locations of park points can be stored in the address management database 122 or in the facility database 140, or in any other desired location. If a scan occurred at a park point, then the server 110 may not take any action. If the scan occurred at a possibly incorrect park point, the server 110 may determine that the package fails the scan metric. The server 110, however, may assess other metrics in addition to the park point scans, prior to generating a failing score on this rule. If the park point scan is the only failure, then the server 110 may not provide a failing score to the package.

Rule 17 analyzes whether a package has been scanned at the same place as multiple other packages. The server 110 can identify that the delivery scans for a plurality of packages have occurred at the same location within a set period of time, e.g., a few minutes or less, or on the same day. In some embodiments, this can be triggered if the server 110 identifies that the location of the delivery scan for a package is not within a geofence for or at the intended delivery point. In this case the server 110 can request information for other packages scanned at the same location within a set time period. If a number of packages are scanned at the same location, this indicates that the carrier is improperly scanning packages for delivery when the packages are not at their respective intended delivery points. Such improper scanning can lead to mis-delivered packages. The server 110 will determine that one or more of the packages whose delivery scans occur at the same location receive a failing scan distance metric.

In some embodiments, however, circumstances may dictate that the delivery scans all occur at the same location. For example, where packages are delivered to parcel lockers, to PO boxes, to apartment buildings, cluster box units (CBUs), or other similar higher density locations, multiple scans at the same location do not indicate a problem. In some embodiments, when the server identifies that multiple packages have been scanned at the same location within a set period of time, the server 110 can query the address management database 124 either directly or indirectly, to identify the destination type. If the destination type is a high density area, a parcel locker, a PO box, etc., then the server 110 does not determine that the package fails the scan distance metric.

Rules 18-26 relate to package visibility. Visibility for packages describes package tracking information and knowledge of the location of a package at each point as it moves through the distribution network. The visibility for packages can be determined using information from the package database 120 and the facility database 140.

Rule 18 analyzes whether the SDD for a package has been reached yet. The server 110 may perform all the analysis, and analyze all the rules described herein, at a given periodicity for all packages in the distribution network, of for all packages in a geographic region, or for some subset of packages in one or more geographic regions. For example, the server 110 may perform this action at the beginning of a day, the end of a day, once per shift, on demand, etc. When the server 110 requests the information for all packages from the facilities database 140, which can include all tracking information, and from the package database 120, the server can analyze each package for one or all the rules herein, or some subset of the rules, depending on the time of day, the on-demand request, and the like.

When the server 110 analyzes all the packages in the distribution network, if the visibility information from the facilities database 140 indicates that a package is moving through the distribution network, and the SDD is not yet reached, then the server 110 determines that the package is exempt from the package score processing described herein.

In some embodiments, the server 110 can forecast whether the package is likely to meet the SDD based on the existing information. If the server 110 forecasts that the package is likely to miss its SDD, then an alert can be generated, and the server 110 can send additional instructions to the facilities database 140 to handle that package differently, such as on an expedited basis. The server 110 can take such action in response to any of the rules described herein, and not just Rule 18. In some embodiments, the server 110 can cause the user interface 150 to display an indication of the problem, or the pending problem.

Rule 18-1 analyzes whether an arrival at unit (AAU) scan is missing. When the AAU scan is missing for military packages, such as packages intended for delivery to overseas military bases, or between military bases, etc., the server 110 does not determine that the package receives a failing visibility score.

Rule 19 analyzes whether a delivery scan was a failed first attempt scan. When a carrier delivers a package and the delivery is not able to be completed for any reason and the package is brought back to the delivery unit, a FFA is identified. The scan for the FFA can occur at the delivery unit after the package is brought back or can occur at the delivery point as the carrier performs a FFA delivery scan with the mobile computing device 122. In some embodiments, the server 110 can infer a FFA when an out for delivery scan occurs followed by a return to unit scan, without a delivery scan therebetween. If the server 110 identifies a FFA, then the package fails the visibility metric.

Rule 20 analyzes whether there is a missing AAU scan. An AAU scan should occur when an item arrives at a distribution network facility from another facility. As a package moves through the distribution network to various facilities, an AAU scan should occur at each facility to indicate that the package arrived at the intended facility. If the server 110 identifies a missing AAU scan for a package (which is not related to the military as in Rule 18-1), the server 110 identifies that the package receives a failing score for the visibility metric. In some embodiments, the server 110 can identify a package scan on item processing equipment from the facilities database 140. The server 110 can determine whether there is an AAU scan associated with the package which was scanned on item processing equipment. If there is no associated AAU scan at the facility, the server 110 determines that the package was improperly received, and the package fails the visibility metric.

The server 110 can initiate an inquiry at other data sources to determine where the package was inducted and what the issue was. The server 110 can query sources in the system 100 or other sources to identify, based on visibility information, the likely induction point of the package. The server 110 can analyze the status of equipment at the likely induction point to see if it has a noted failure or deficiency. The server 110 can initiate analysis of other packages or items that were inducted at that induction point to see if there is a pattern of failure at a particular indication point (such as a post office), in a specific geographic area, etc. The server can provide notifications and instructions via the user interface 150 when such problems are identified.

Rule 21 analyzes whether the package has an out for delivery scan. A package to be delivered from a postal facility will be scanned at the facility when loaded onto a vehicle or when a carrier takes the package to the route for delivery. This informs the visibility systems that the package is on its way to be delivered that day. The server 110 can identify packages that are to be delivered on a given day, based on the tracking information from the facility database 140. If the out for delivery scan does not occur on the expected day, the server 110 can identify that the package fails the visibility metric. In some embodiments, the server 110 can receive a delivery scan for a package, but there is no associated out for delivery scan. In these cases the server can identify there is a missing out for delivery scan, and the package receives a failing score on the visibility metric.

Rule 22 analyzes whether an appropriate acceptance scan occurs for a package. An acceptance scan should occur when the distribution network picks up a package from an entity for delivery. For example, if a commercial online retailer intended to ship an item via the USPS, then USPS would perform an acceptance scan when the USPS either picked up the package, or when the package was provided to USPS. The server 110 can identify a missing acceptance scan when the server 110 identifies any scan on distribution network equipment, but there is no associated acceptance scan for the package. If there is no acceptance scan for the package, the server 110 determines that the package fails the visibility metric.

Rules 23 and 24 analyze whether the proper enroute scans occurred. For each leg of a packages movement through the distribution network, origination and destination enroute scans should be received. These scans provide visibility for packages as they move through the network. The server 110 analyzes the enroute data from the facilities database 140 and determines whether origination and destination enroute scans are present. If either an origination or destination enroute scan is missing, the server 110 determines that the package fails the visibility metric.

Rule 25 analyzes whether an acceptable delivery event scan has occurred. As described elsewhere herein, a delivery scan occurs, or should occur, when an item is delivered to a delivery point. The server 110 may identify such a situation where an out for delivery scan is seen and there is no delivery scan and no return to unit scan for a package. If the server 110 identifies that there is no acceptable delivery scan, then the server 110 determines that the package fails the visibility metric.

Rule 26 analyzes whether a customer inquiry occurred for a package. The server 110 queries the customer service database 130 to determine whether, for a given package, there was a customer inquiry. The customer inquiry can be via an online inquiry, it can be identified via a call to a customer service center, or by some other channel, as described elsewhere herein. If the server 110 identifies that there was a customer inquiry for a given package, that package fails the customer inquiry metric.

Figure 2:
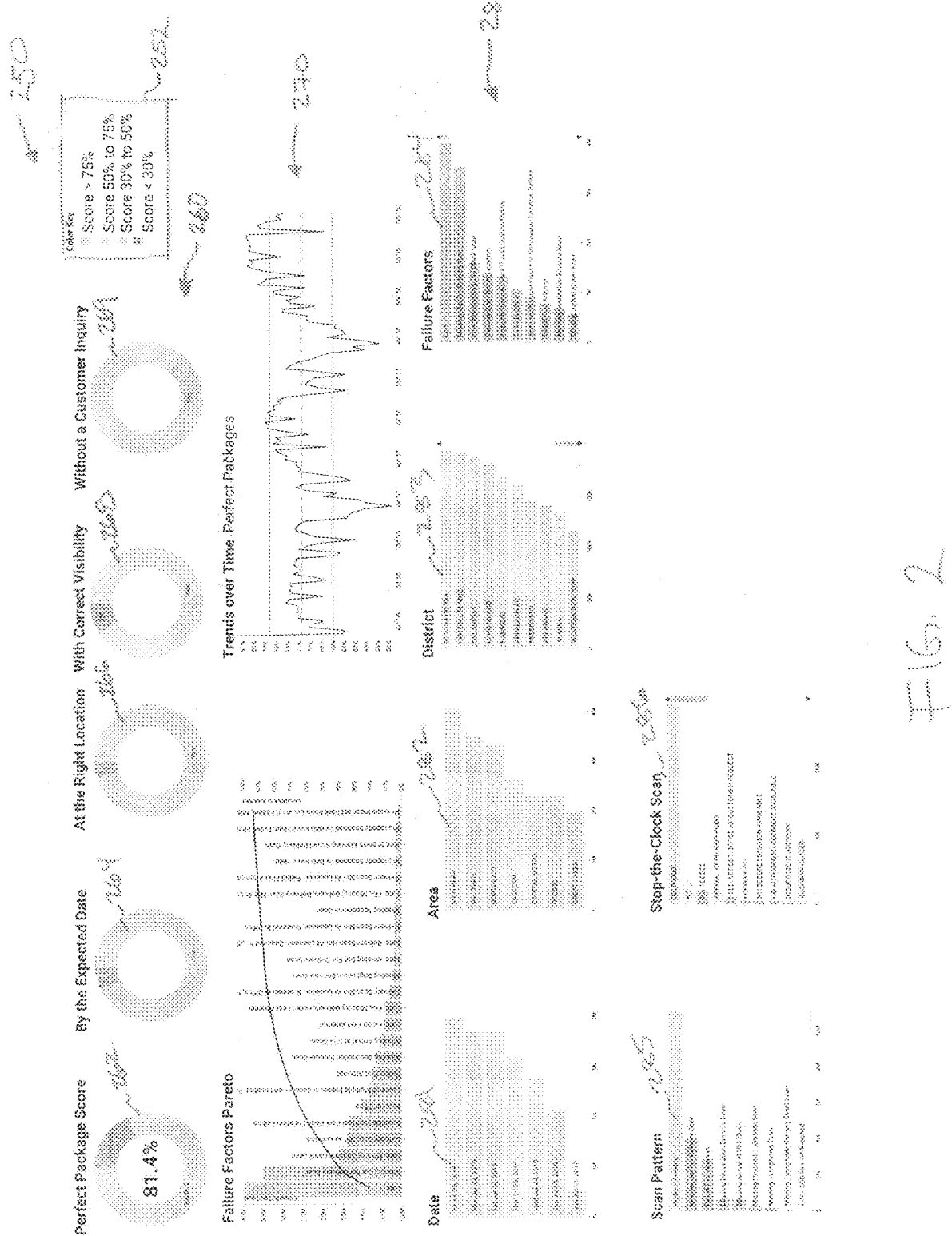
FIG. 2 is an exemplary view of a graphical user interface showing summary information.

FIG. 2 depicts an embodiment of a graphical user interface displaying summary information. An interface 250 displays information regarding package deliveries within the distribution network in a summary or overview format. The interface 250 includes a score section 260, a graphical section 270, and a data selection section 280. The interface 250 can display data according to a color key 252, which indicates the ranges of scores displayed in color for easy recognition of problem areas.

The score section 260 includes an overall package score 262. The overall package score 262 displays a percentage of packages that have been delivered which have obtained a "perfect package" score. The perfect package determination is made by the server 110 using many factors obtained from the package database 120, the customer service database 130, the facility database 140 and other factors, as desired.

The package scores for individual items are determined by the above rules. The overall package score 262 shows that out of a plurality of packages whose data was analyzed, which can be in the range of millions of packages, 81.4% passed, did not fail any of the Rules described above, or achieved a score of "perfect." the package score rules described above. If a package failed any of the rules or metrics, the package was identified as a failure.

The score section 260 also includes a service date score 264, a location score 266, a visibility score 268, and a customer inquiry score 269. These scores can illustrate reasons for packages failing in the overall package score 262 The service date score 264 graphically depicts the number, percent, or quantity of packages which passed and which failed the scan distance metrics and/or the rules related to service date. In some embodiments, the service date score graphically shows the percentage of packages that did and not fail Rules 4 through 10.

The location score 266 graphically depicts the number, percent, or quantity of packages which passed and which failed the scan distance metrics and/or rules related to scan distance. In some embodiments, the service date score graphically shows the percentage of packages that did and did not fail Rules 11-17 or, in some embodiments, Rules 13-17.

The visibility score 268 graphically depicts the number, percent, or quantity of packages which passed and which failed the visibility metrics and/or rules related to visibility. In some embodiments, the service date score graphically shows the percentage of packages that did and did not fail Rules 18-25.

The customer inquiry score 269 graphically depicts the number, percent, or quantity of packages which passed and which failed the customer inquiry metrics and/or rules related to customer inquiry. In some embodiments, the service date score graphically shows the percentage of packages that did and that did not fail Rule 26.

The graphical scores described herein are not limited to only the rules described above. One of skill in the art, guided by this disclosure, would understand that package score data, delivery data, and the like, can be used, manipulated, evaluated, displayed, etc., in various ways, as needed to achieve a desired result in analyzing the data.

The graphical section 272 includes a failure factors pareto 272 and a trend graph 274. The failure factors pareto 272 displays information in bars as a number of packages which failed which Rules. As depicted, failure factors pareto 272 shows the number of packages that failed the late service date standard, such as Rule 6 described herein. The failure factors pareto 272 also shows a cumulative line depicting the percentage of all failures.

The trend graph 274 depicts the percent of packages over time receiving a perfect package score, that is, a package that did not fail any rules. The time period for the failure graph can be any desired time period, such as a week, a month, a quarter, a year, etc. The trend graph 274 can identify times where more packages have errors in the process. The trend graph 274 can also display trends over areas, or can be used to compare geographic areas to each other. For example, the geographic areas serviced by the distribution network, at any level of granularity, can be displayed on the trend graph to identify areas which have more perfect packages and which have fewer perfect packages.

The server 110 can evaluate the trends either using the trend graph 274, using the data from which the trend graph 274 is produced, or via other processes. The server 110 can identify times, locations, areas, which are prone to errors. In some embodiments, the server 110 uses machine learning tools to identify patterns in the data indicative of a problem or a prospective problem. The server 110 can identify which errors occur most frequently in which geographic areas, and can automatically, or at the request of a user, send instructions to a supervisor, to processing equipment, to scanning equipment, etc., to take action to correct a problem. For example, if a particular geographic area has more failures in AAU scans than other areas, the server 110 can indicate that maintenance is needed on item sorting equipment which performs AAU scans at a facility in that geographic area. The server 110 can identify which facilities have the highest volume of packages for a geographic area and can identify the equipment at the high volume facilities as the likely source of the problem.

In some embodiments, where an AAU scan, acceptance scan, or other similar problem occurs, the server 110 can identify that a package is potentially missing, has been misrouted, a label has been damaged, or the package is otherwise unaccounted for. The server 110 can initiate a search for the package that should have been scanned but was not scanned. To find the package, a facility may have a mesh network of detectors to identify the location of a package within a facility, and the server 110 can initiate the search action to identify the location of the parcel missing a scan. In some embodiments, the server 110 can notify a supervisor that an item did not receive the correct scan and can prompt a search for the item.

In another example, the server 110 can identify that a certain delivery unit, such as a post office, has a higher incidence of failures of out for delivery scans and/or delivery event scans. The server 110 can identify that there is a problem with one or more mobile computing devices 122 used at that delivery unit, and can automatically, or at the request of a user, notify regarding the problem, inactivate a mobile computing device 122, or take other action to correct a problem or a potential problem. In some embodiments, the server 110 can identify that a particular delivery resource is prone to errors or mistakes, and corrective action can be taken.

The server 110 can proactively identify issues in the distribution network as noted above. To illustrate, a customer may not have any concerns with a package delivery that fails the perfect package score, if the package is delivered on time. The failure of the perfect package score can indicate a problem that may, at a future time, affect delivery times and customer satisfaction. For example, a package can fail Rule 15 or 17 because it the delivery scan occurred at a location other than the delivery point, or occurred at the same location at about the same time as several other delivery scans. The customer may receive the correct package on the expected date, but it may be only a matter of time until a mistake is made, and the incorrect package is delivered, or the package misses the delivery date because of a carrier error. The server 110 identifies trends, problems, anomalies, outliers, etc., in the score data, and can take action to fix the situation. In the example above, the server 110 can cause the mobile communication device 122 to provide a warning to the carrier when the delivery scan occurs outside the geofence for the delivery point, or will not accept the delivery scan until the mobile communication device 122 is within the geofence for the delivery point. In some embodiments, the server 110 will notify a supervisor at the facility where errors, problems, anomalies are indicated.

In some embodiments, the server 110 can employ machine learning algorithms to identify potential problems based on past package information. The machine learning network can be trained using package data and problems that arise, and the machine learning algorithm can be tuned to identify a number of problems or issues before they arise.

The data selection section 280 includes sections for date 281, area 282, district 283, failure factors 284, scan pattern 285, and stop-the-clock scans 286. The date 281 provides graphical bars indicating a number of packages on an x-axis and a row of a particular dates. As shown, on Friday, July 2019, there were nearly 4 million packages tracked and analyzed by the system 100. In some embodiments, the bars associated with the date can include color indicators of the perfect package percentage and the failure percentages. A user can click or select a particular date to cause the user interface 250 to display all of the described features for only the particular day selected.

The area 282 provides graphical bars indicating a number of packages on an x-axis and a row corresponding to geographic regions of the distribution network. As shown, the Southern area has the highest number of packages. In some embodiments, the bars associated with the area can include color indicators of the perfect package percentage and the failure percentages. A user can click or select a particular area to cause the user interface 250 to display the described features for only the particular area selected.

When an area is selected from area 282, the district 283 menu will indicate the sub-areas or geographic areas within the selected geographic area. These sub-areas can be referred to as districts. The district 283 section performs similar to the area 282. Selecting one of the districts will update other features of the user interface 250 to display information, scores, trends, etc. for the selected district.

The failure factors 284 menu is similar to the area 282 and the district 283. The failure factor 284 menu will show for the selected area 282 and district 283 the highest or most frequent failure causes. The san pattern 285 selects specific rules related to scans to allow the server 110 or supervisor to focus on scan related issues to identify and remedy existing problems and to identify and remedy issues that could become problems.

The stop-the-clock scans 286 displays the types of stop-the-clock scans for the selected date 281, area 282, and/or district 283. The stop-the-clock scans can include the following categories: delivered, no access, arrival at pick-up point, held at office per customer request, forwarded, no secure location available, no authorized recipient available, insufficient address, business closed, etc. As noted above, all stop-the-clock scans which are not delivery scans, indicate a FFA, and fail Rule 19. Showing a number of packages and their associated stop-the-clock scan categories can allow a supervisor to assess, explain, and/or remedy packages with FFAs. The server 110 can parse the stop-the-clock scan types and identify trends and take corrective action as needed.

Figure 3:
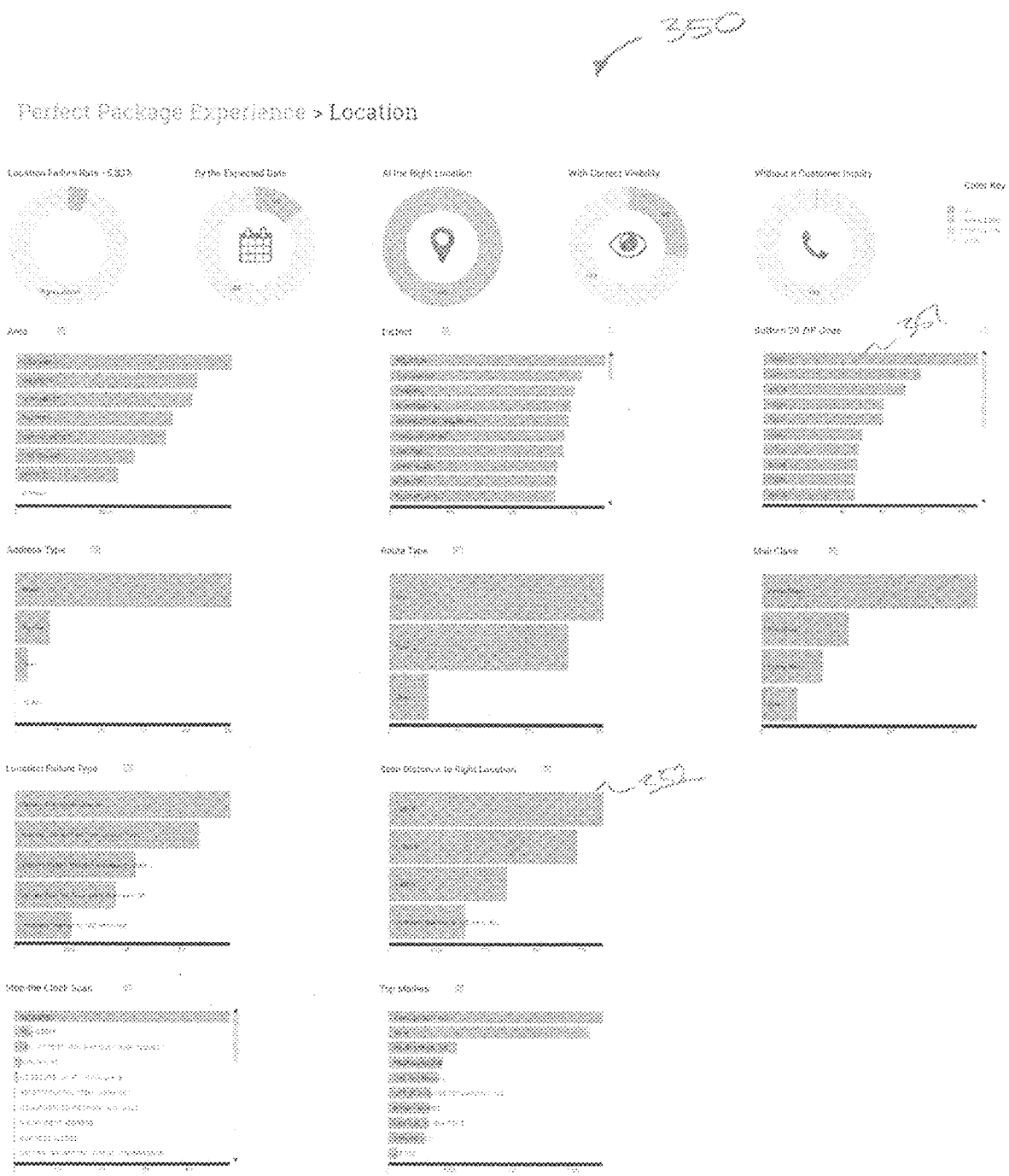
FIG. 3 is an exemplary view of a graphical user interface for package delivery.

FIG. 3 depicts a user interface 350. The location user interface 350 can be similar to user interfaces described elsewhere herein. The location user interface 350 can be displayed when a user selects a portion of the user interface 250, for example, if a user selects the scan location score 266. The location user interface 350 can display package scores described elsewhere herein. The location user interface 350 can display several graphs or visual data depictions related to packages which fail scan location rules. The location user interface 350 can depict data broken down by zip code, mail class, route type, etc. For example, the server 110 can identify a number of zip codes, such as 10 or 20, which have the worst package performance, and can display those in a zip code section 351. The zip code list can vary by area or district as selected on the location user interface 350.

In some embodiments, the location user interface 350 can show graph regarding scan distance to correct location. The server 110 can determine the distances between the scan location and the correct delivery location. The server 110 can cause the distances to be displayed on the location user interface in a scan distance section 352. The server 110 can display either only those packages who failed the scan distance metric, or all packages categorized by distance to correct delivery points. The scan distance section can display bars indicating a number or percent of packages which fall within a distance category. For example, the distance categories displayed are >250 feet, >500 feet, >1000 feet, although any distance could be used without departing from the scope of the current disclosure.

The location interface 350 can also show bar graphs indicating the number of failures or passes broken down by area, district, ZIP code, etc. The location interface 350 can also show the number or rate of failures by address type, route type, mail class, etc. The location interface 350 can further show charts or graphs of the type of location failure such as location failure type, scan distance, etc. These can be generated by the server 110 by identifying which rules packages failed most frequently, or which category of rules packages failed most frequently.

Figure 4:
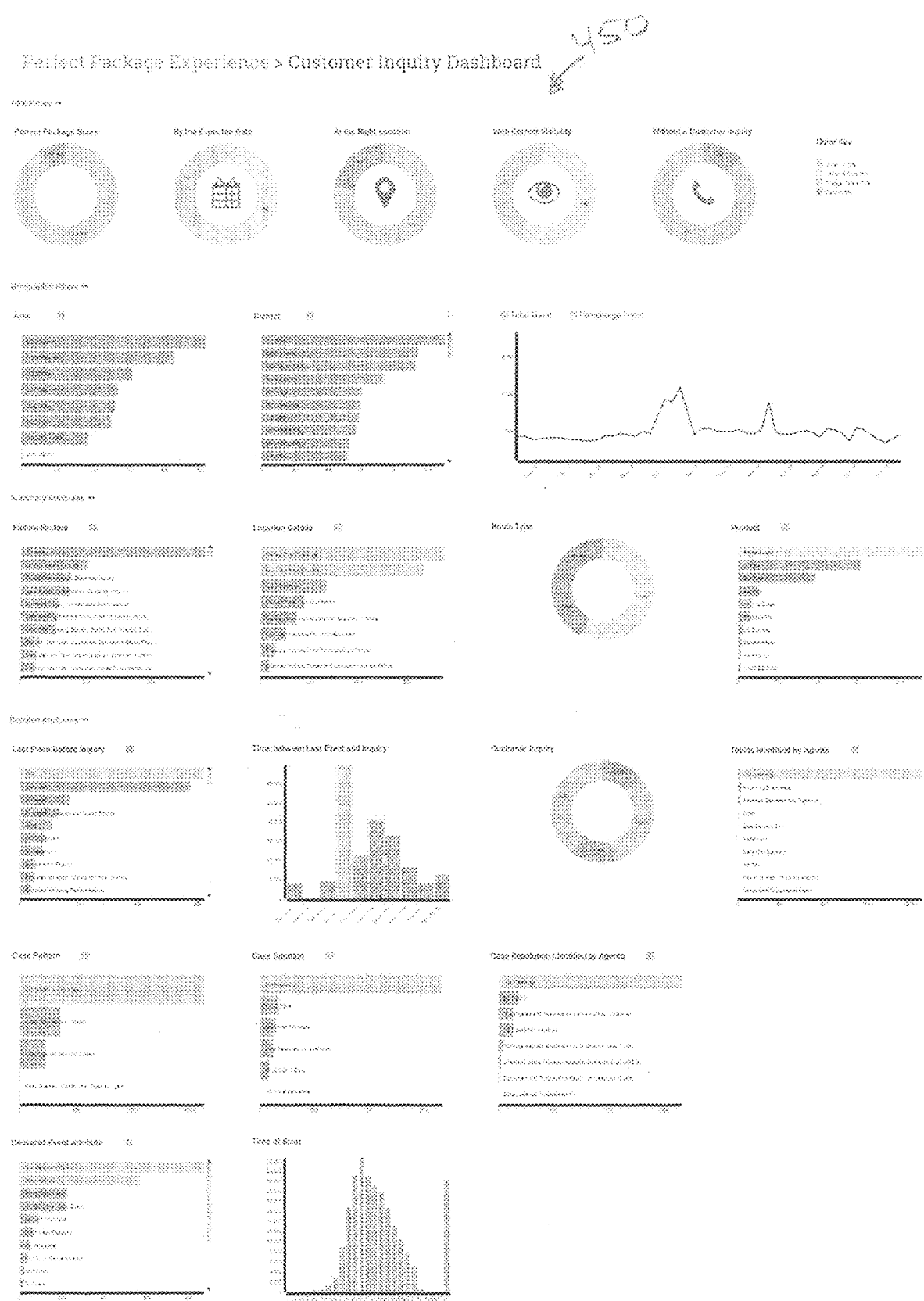
FIG. 4 is an exemplary view of a graphical user interface for package delivery.

FIG. 4 depicts a customer inquiry user interface 450. The customer inquiry user interface 450 can be similar to user interfaces described elsewhere herein. The customer inquiry user interface 450 can be displayed when a user selects a portion of the user interface 250, for example, if a user selects the customer inquiry score 269. The customer inquiry user interface 450 includes metrics obtained from the customer service database 130, such as the type of product, route type, the case pattern, resolution, and the like. The customer inquiry user interface 450 can include categories of issues from the customer service database 130, such as late, FFA, etc. The customer inquiry user interface 450 can show metrics or graphs of data generated by the server 110, and can show failures by area, district, which factors caused failure, the most common last scan event before failure, time between a scan event and an inquiry, etc.

Figure 5:
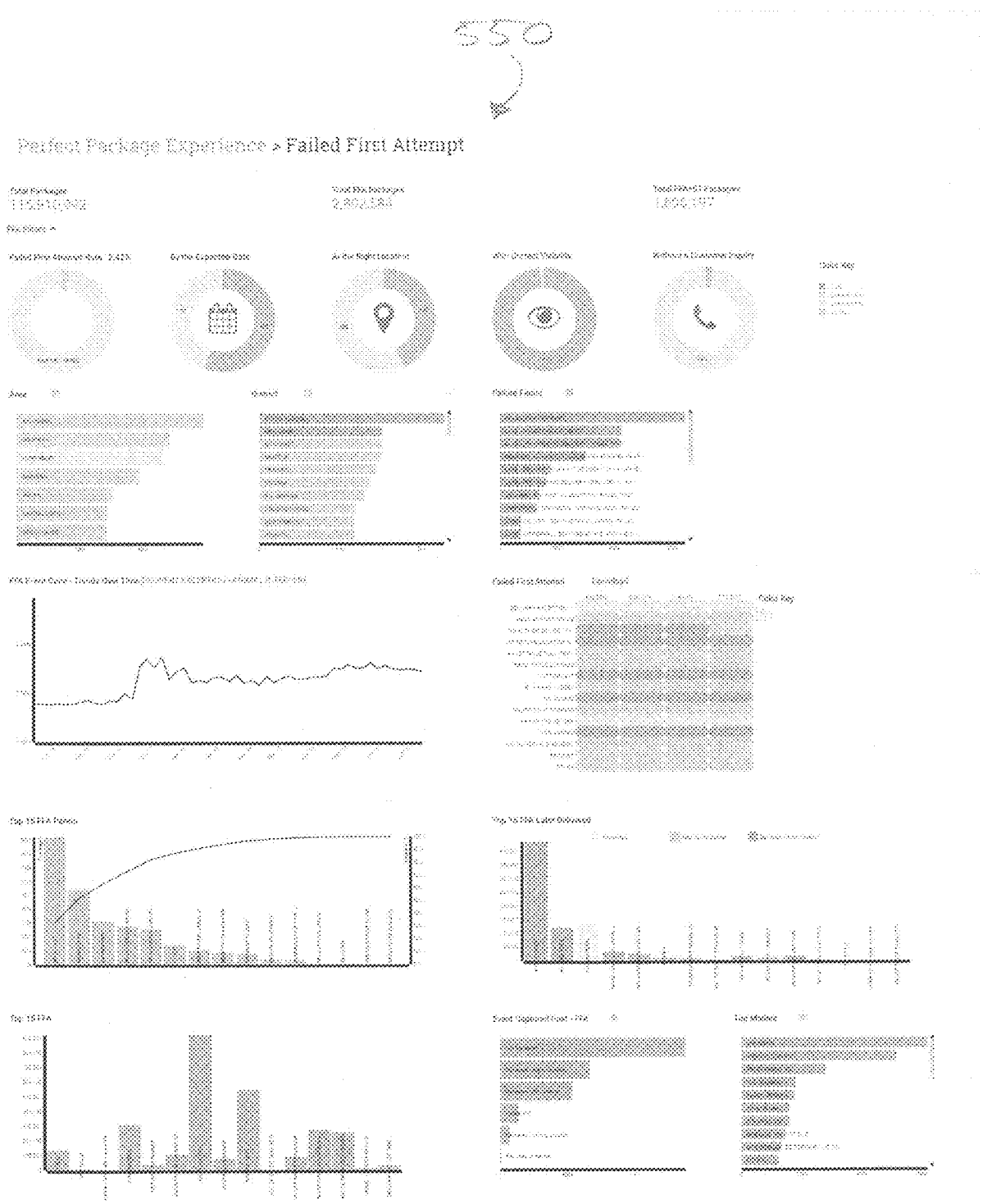
FIG. 5 is an exemplary view of a graphical user interface for package delivery.

FIG. 5 depicts a FFA user interface 550. The FFA user interface 550 can be similar to user interfaces described elsewhere herein. The FFA user interface 550 can be displayed when a user selects a portion of the user interface 250, for example, if a user selects the a failure factor 284, or other portion of the user interface 250, as desired. The FFA user interface 550 can display detailed information regarding FFA reasons as received from the mobile communication devices 122, dates of FFAs, trends of FFAs by region, area, district, etc.

Figure 6:
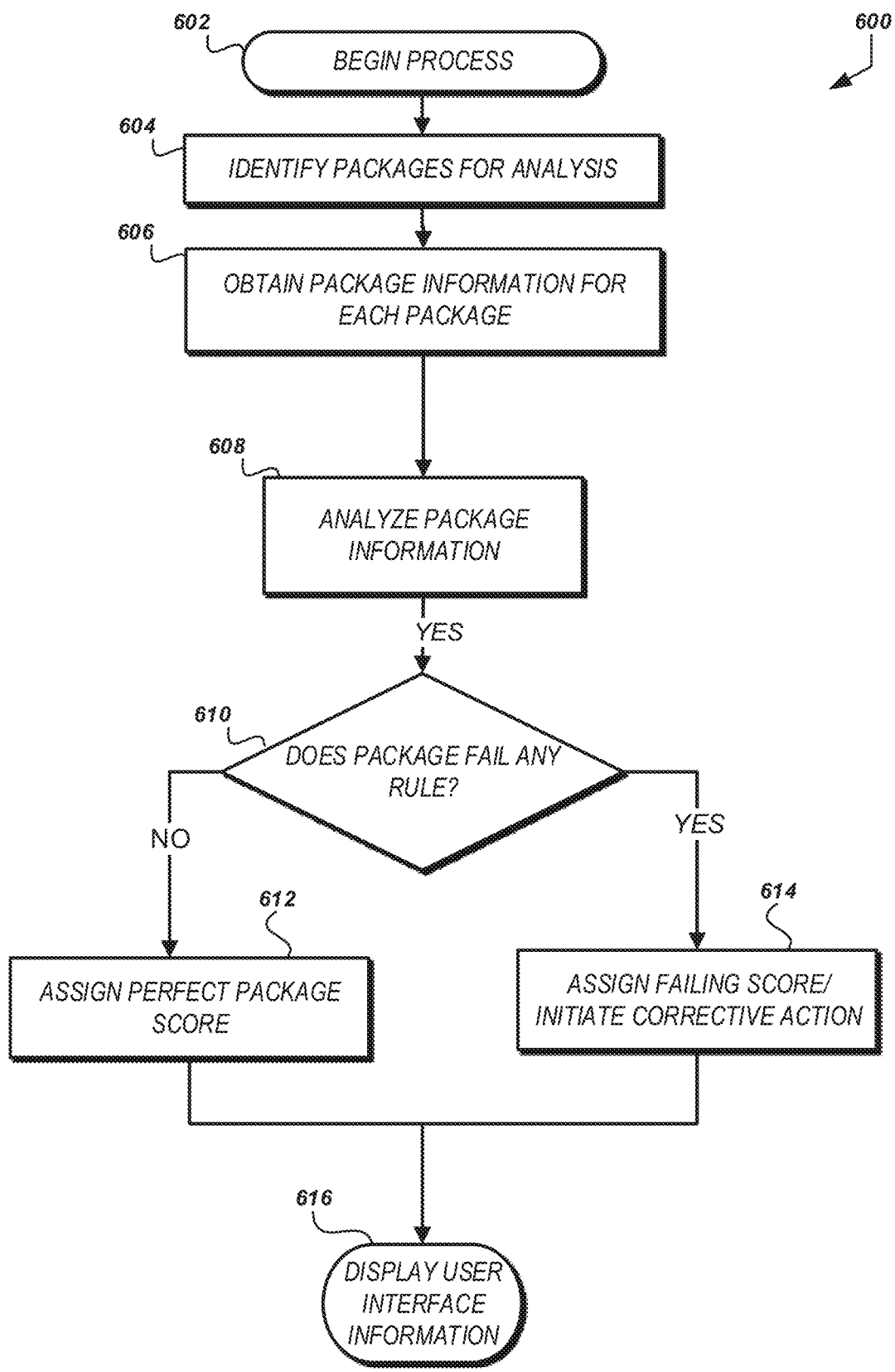
FIG. 6 is a flow chart depicting an embodiment of a process for generating a package score.

FIG. 6 is a flow chart depicting an embodiment of a process for generating a package score. A process 600 begins in block 602. The process 600 moves to block 604, wherein the server 110 identifies packages for analysis.

The server 110 can identify packages for analysis a variety of different ways, each of which is explicitly contemplated by the present disclosure. In some embodiments, the server 110 can query the package database 120 for all packages for which package records exist for a specified time period. Each package receives a unique identifier, and the unique identifier is associated with the package and package information in the package database 120. The server 110 analyze all packages from the specified time period according to the process 600. In some embodiments, the server 110 analyzes packages from only a given geographic area. In some embodiments the serve 110 analyzes packages from all geographic areas individually and then combines the information from all geographic areas into an overall analysis.

In some embodiments, the server can identify for analysis those packages analysis for which an active package record exists. The package records can be entries in the package database 140 which are active, that is, which have not yet been delivered, or which have not expired from non-use. The server 110 can proceed with the method 600 for each package having an active record.

In some embodiments, the server 110 can identify packages which have been inducted and for which an acceptance scan exists. This indicates that the distribution network is in physical possession of these items. In some embodiments, the server 110 can run an analysis under Rule 5-1 on all packages and can exempt from further analysis any package deemed exempt.

In some embodiments, the server 110 can identify any group, subset, classification, or other categorization of packages for analysis. In some embodiments, the server 110 runs the analysis every day, every week, every shift, or at any other desired periodicity. In some embodiments, the server 110 can identify packages which have been delivered over a given time period, within a given geographic area, or within a geographic area within a given time. In some embodiments, a mailer or shipper of items can request the server 110 provide analysis of packages which the sender or shipper sent.

The process 600 moves to block 606, wherein the server 110 obtains information for each identified package. The server 110 queries the package database 120, the customer service database 130, the facilities database 140, and any other data sources for package information. The package information can be similar to that described elsewhere herein, for example, with regard to Rules 1-26.

The process 600 moves to block 608, wherein the server 110 analyzes the obtained package information. The server 110 can analyze the obtained package information according to Rules 1-26 described herein. In some embodiments, the server 110 can analyze only a subset of the rules described herein, and/or can analyze for any additional characteristic, status, etc., as desired. In some embodiments, the server 110 analyzes the obtained package information to generate scores for service date, scan distance, visibility, and customer inquiry separately or concurrently.

In some embodiments, the server 110 uses the information and algorithms described herein to determine whether the packages identified for analysis fail a rule, criterion, or requirement for a package score.

The process 600 moves to decision state 610, wherein the server 110 determines whether the packages fail any rule. For example, the server 110 analyzes the package information for the identified packages to determine whether the package information indicates that the package failed to meet any rule. In some embodiments, the server 110 analyzes whether other criteria is met or not met. As noted elsewhere herein, some rules or criteria may not lead to a failing package score by themselves. Some rules may only be failed under certain conditions. In some embodiments, the server 110 can determine how many rules are failed, and if the percent of rules failed is small enough, the package can get a non-failing score. In some embodiments, the package score is not a fail/no fail binary score, but is a percentage. In some embodiments, the rules can be weighted as desired to generate a percentage score.

If the package is determined not to fail the package score analysis according to the criteria established, the process 600 moves to block 612, wherein the package is assigned a perfect package score. If the package is determined to fail the package score analysis, the process 600 moves to block 614, wherein a failing score is assigned. The server 110 initiates corrective action, sends notifications, etc., as described herein.

In some embodiments, corrective actions can be initiated automatically based on a threshold number of items failing a certain rule, a certain number of items failing within a geographic area, a number of items failing which have passed through a certain distribution facility, which are assigned to a particular deliver resource, etc. For example, if the server 110 identifies that a particular facility, a particular piece of item processing equipment, a mobile delivery device, or carrier has a threshold number of failures, has a higher number of failures than the average, or any other determination, the server can initiate corrective actions by requesting maintenance on an item, by requesting further information from a piece of item processing equipment or carrier for more in-depth analysis. The corrective action can be providing an alert, by running a maintenance program, performing maintenance, running a diagnostic check, etc.

If, for example, if one machine or mobile delivery device have a higher number of items processed therewith that fail, the server 110 can cause further items not to be processed by the machine or mobile delivery device which has the higher than average or too-high number of failures. If a certain mobile delivery device, for example, is associated with a higher than average or too-high number of failures, such as failures of out for delivery scans, the server 110 can determine that the mobile delivery device should be taken out of service, inactivated, and/or that maintenance needs to be performed on that mobile delivery device. In some embodiments, if a certain mobile delivery device has a high number of wrong location scans, the server 110 can inactivate the mobile delivery device, prevent logging in to that device, etc. If a particular route has a high number of failures due to wrong location scans, the server 110 can initiate actions to determine whether the failures are a result of inaccurate GPS coordinates for delivery points, or due to another factor. If a route is classified as an urban route where there may be more interference with accurate GPS signals due to tall buildings or other factors, the server 110 can change or expand geofences, request additional or more frequent scans of items, and the like in order to determine the cause of the increased number of failures.

If a certain piece of item processing equipment is associated with a high number of failures due to late delivery, such as not meeting an SSD, the server 110 can reroute items processed in the facility where the item processing equipment is located to another piece of item processing equipment.

These corrective actions described herein are exemplary only. A person of skill in the art, guided by this disclosure, can identify other corrective actions without departing from the scope of this disclosure.

The process moves to block 616, wherein the server generates and displays package score information on the user interface 150. The process 600 then ends.

Various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and steps described above. Whether such functionality is implemented in hardware or software depends upon the particular application and design constraints imposed on the overall system.

In one or more aspects, the functions described herein may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable storage medium. The steps of a method or algorithm disclosed herein may be implemented in a processor-executable software module which may reside on a computer-readable storage medium. Computer-readable storage media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above can also be included within the scope of computer-readable storage media. Additionally, the operations of a method or algorithm may reside as one or any combination or set of codes and instructions on a machine readable storage medium and computer-readable storage medium, which may be incorporated into a computer program product.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Instructions refer to computer-implemented steps for processing information in the system. Instructions can be implemented in software, firmware or hardware and include any type of programmed step undertaken by components of the system.

As can be appreciated by one of ordinary skill in the art, each of the modules of the invention may comprise various sub-routines, procedures, definitional statements, and macros. Each of the modules are typically separately compiled and linked into a single executable program. Therefore, the description of each of the modules is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware. A person of skill in the art will understand that the functions and operations of the electrical, electronic, and computer components described herein can be carried out automatically according to interactions between components without the need for user interaction.

The foregoing description details certain embodiments. It will be appreciated, however, that no matter how detailed the foregoing appears in text, the development may be practiced in many ways. It should be noted that the use of particular terminology when describing certain features or aspects of the development should not be taken to imply that the terminology is being re-defined herein to be restricted to including any specific characteristics of the features or aspects of the development with which that terminology is associated.

While the above detailed description has shown, described, and pointed out novel features of the development as applied to various embodiments, it will be understood that various omissions, substitutions, and changes in the form and details of the device or process illustrated may be made by those skilled in the technology without departing from the intent of the development. The scope of the development is indicated by the appended claims rather than by the foregoing description. All changes which come within the meaning and range of equivalency of the claims are to be embraced within their scope.

What is claimed is:

1. A method for distributing items, the method comprising:
receiving, from a plurality of item processing equipment in a distribution network, scan data, the scan data comprising item information;
storing, in a memory, one or more delivery rules for each of a plurality of delivery categories;
receiving item information for the plurality of items received in the plurality of item processing equipment, the item information comprising data for the plurality of delivery categories;
analyzing the data for the plurality of delivery categories for the plurality of items according to one or more delivery rules;
determining that each of the plurality of items is exempt or non-exempt from the one or more delivery rules;
determining, in a server, that the data for one or more of the plurality of delivery categories for the plurality of items which are non-exempt initially fails one or more of the delivery rules for a corresponding delivery category;
determining, whether additional data is needed for the one or more of the delivery categories initially failing the one or more of the delivery rules for the corresponding delivery category;
receiving, in the server, the additional data;
determining, in the server, based on the additional data, whether any of the plurality of items associated with the data for the one or more of the plurality of delivery categories which initially failed the one or more delivery rules finally fails to meet one or more of the delivery rules;
identifying a potential processing equipment failure based on the determining any of the plurality of items finally fails to meet the one or more delivery rules; and
automatically redirecting one or more of the plurality of items away from the processing equipment identified as a potential failure;
and
based on identifying the processing equipment as the potential failure, automatically causing, by a server, the processing equipment identified as the potential failure to be inactivated.

2. The method of claim 1, wherein the item information comprises scan information and location information.

3. The method of claim 2, further comprising receiving, in an interface, a request for delivery performance information, and wherein the request for delivery performance information comprises a request for information for a subset of the plurality of delivery rules.

4. The method of claim 3, wherein the request for delivery performance information comprises a selection of geographic area.

5. The method of claim 4, wherein requesting item information comprises requesting the item information for the plurality of items which are associated with the selected geographic area.

6. The method of claim 5, further comprising identifying a potential processing equipment failure within the selected geographic area.

7. The method of claim 3, wherein the request for delivery performance information comprises a selection of a period of time.

8. The method of claim 7, wherein requesting item information comprises requesting the item information for the plurality of items which are associated with the selected period of time.

9. The method of claim 1, further comprising generating, for each of the plurality of items, a score based on determining whether any of the plurality of items fails to meet the one or more delivery rules and generating an overall score for the plurality of items based on the determined scores for each of the plurality of items.

10. A system for distributing items, the system comprising:
a memory storing one or more delivery rules for each of a plurality of delivery categories;
a plurality of item processing equipment in a distribution network, each item processing equipment comprising one or more scanners, the plurality of item processing equipment configured to:
receive a plurality of items; and
generate scan data for the plurality of items, the scan data comprising item information;
one or more processors configured to:
receive, from an interface, a request for delivery performance information;
receive the scan data for the plurality of items, the scan data comprising data for the plurality of delivery categories;
analyze the data for the plurality of delivery categories for the plurality of items according to one or more delivery rules;
determine whether each of the plurality of items is exempt from the one or more delivery rules;
determine that the data for one or more of the plurality of delivery categories initially fails one or more of the delivery rules for a corresponding delivery category;
determine, whether additional data is needed for the one or more of the delivery categories initially failing the one or more of the delivery rules for the corresponding delivery category;
receive, in a server, the additional data;
determine, based on the additional data, whether any of the plurality of items associated with the data for the one or more of the plurality of delivery categories which initially failed to meet one or more delivery rules finally fails to meet one or more of the delivery rules;
identify a potential processing equipment failure based on the determining any of the plurality of items finally fails to meet the one or more delivery rules; and
automatically redirect one or more of the plurality of items away from the processing equipment identified as a potential failure;
and
based on identifying the processing equipment as the potential failure, automatically, cause the processing equipment identified as the potential failure to be inactivated.

11. The system of claim 10, wherein the item information comprises scan information and location information.

12. The system of claim 10, wherein the request for delivery performance information comprises a subset of the plurality of delivery rules.

13. The system of claim 10, wherein the request for delivery performance information comprises a selection of geographic area.

14. The system of claim 13, wherein the processor is further configured to request the item information for the plurality of items which are associated with the selected geographic area.

15. The system of claim 14, wherein the processor is further configured to identify the potential processing equipment failure within the selected geographic area.

16. The system of claim 10, wherein the request for delivery performance information comprises a selection of a period of time.

17. The system of claim 15, wherein the processor is further configured to request the item information for the plurality of items which are associated with the selected period of time.

18. The system of claim 10, wherein the processor is further configured to generate for each of the plurality of items, a score based on determining whether any of the plurality of items fails to meet the one or more delivery rules and to generate an overall score for the plurality of items based on the determined scores for each of the plurality of items.

19. The method of claim 1, further comprising:
identifying a plurality of geographic areas of the distribution network;
determining a score for each of the plurality of geographic area based on the items of the plurality of non-exempt items delivered to delivery points within the each of the plurality of geographic areas which initially or finally failed one or more of the delivery rules; and
causing item processing equipment to route additional items to areas having a score above a threshold.

20. The system of claim 10, wherein the one or more processors are further configured to:
identify a plurality of geographic areas of the distribution network;
determine a score for each of the plurality of geographic area based on the non-exempt items of the plurality of items delivered to delivery points within the each of the plurality of geographic areas which initially or finally failed one or more of the delivery rules; and
cause item processing equipment to route additional items to areas having a score above a threshold.

* * * * *